United States Patent
Falk

(10) Patent No.: US 10,958,447 B2
(45) Date of Patent: *Mar. 23, 2021

(54) METHOD, SECURITY DEVICE AND SECURITY SYSTEM

(71) Applicant: Siemens Aktiengesellschaft, Munich (DE)

(72) Inventor: Rainer Falk, Poing (DE)

(73) Assignee: Siemens Aktiengesellschaft, Munich (DE)

(*) Notice: Subject to any disclaimer, the term of this patent is extended or adjusted under 35 U.S.C. 154(b) by 204 days.

This patent is subject to a terminal disclaimer.

(21) Appl. No.: 16/020,156

(22) Filed: Jun. 27, 2018

(65) Prior Publication Data

US 2019/0007220 A1 Jan. 3, 2019

(30) Foreign Application Priority Data

Jun. 29, 2017 (EP) .................................... 17178641

(51) Int. Cl.
*H04L 29/06* (2006.01)
*H04L 9/32* (2006.01)
(Continued)

(52) U.S. Cl.
CPC ............ *H04L 9/3263* (2013.01); *H04L 9/006* (2013.01); *H04L 9/0891* (2013.01);
(Continued)

(58) Field of Classification Search
USPC ........................................................ 713/156
See application file for complete search history.

(56) References Cited

U.S. PATENT DOCUMENTS

| 7,003,677 B1* | 2/2006 | Herzberg | H04L 9/0833 380/286 |
| 7,100,044 B2* | 8/2006 | Watanabe | H04L 9/3231 713/155 |

(Continued)

FOREIGN PATENT DOCUMENTS

| CN | 105075219 | 11/2015 |
| CN | 106797311 | 5/2017 |

(Continued)

OTHER PUBLICATIONS

Office Action dated Dec. 1, 2020 issued in Chinese Patent Application No. 201810689730.5.

*Primary Examiner* — Amare F Tabor
(74) *Attorney, Agent, or Firm* — Cozen O'Connor

(57) ABSTRACT

An apparatus, a security device, a security system comprising the security device and the apparatus, and a method for generating an apparatus-specific apparatus certificate for the apparatus includes coupling the security device to the apparatus, a one-time useable private signing key being stored in the security device, storing apparatus-specific identification information in the security device, accessing the private signing key in the security device, generating the apparatus-specific apparatus certificate depending on the stored identification information in the security device, the apparatus-specific apparatus certificate being signed using the private signing key, and preventing a further access to the private signing key such that it becomes possible to generate an apparatus-specific apparatus certificate for an apparatus with little complexity, in particular without using a public key infrastructure.

13 Claims, 5 Drawing Sheets

(51) Int. Cl.
*H04L 9/08* (2006.01)
*H04L 9/00* (2006.01)

(52) U.S. Cl.
CPC .......... *H04L 9/0897* (2013.01); *H04L 9/3234* (2013.01); *H04L 9/3247* (2013.01); *H04L 9/3268* (2013.01)

(56) References Cited

U.S. PATENT DOCUMENTS

| | | | | |
|---|---|---|---|---|
| 7,694,330 B2 * | 4/2010 | Kung | ................. | H04L 9/3263 |
| | | | | 726/9 |
| 7,930,554 B2 * | 4/2011 | Coulier | ................. | G06F 21/31 |
| | | | | 713/184 |
| 8,639,915 B2 * | 1/2014 | Graunke | ................. | H04L 9/0891 |
| | | | | 380/279 |
| 8,701,169 B2 * | 4/2014 | Campagna | ............ | H04L 9/3236 |
| | | | | 726/6 |
| 8,788,811 B2 * | 7/2014 | Fu | ................. | H04L 9/0825 |
| | | | | 713/156 |
| 10,148,441 B2 * | 12/2018 | Kaliski, Jr. | ............ | H04L 9/3247 |
| 2004/0117626 A1 * | 6/2004 | Andreasyan | .......... | H04L 9/0841 |
| | | | | 713/175 |
| 2006/0020811 A1 | 1/2006 | Tan | | |
| 2008/0114984 A1 * | 5/2008 | Srinivasan | ............. | G06F 21/73 |
| | | | | 713/175 |
| 2014/0181504 A1 * | 6/2014 | Almahallawy | ....... | H04L 63/062 |
| | | | | 713/156 |
| 2016/0057134 A1 | 2/2016 | Falk et al. | | |
| 2016/0057141 A1 | 2/2016 | Van Den Broeck et al. | | |
| 2017/0054566 A1 | 2/2017 | Nitschke | | |
| 2018/0026787 A1 | 1/2018 | Le Saint et al. | | |

FOREIGN PATENT DOCUMENTS

| | | |
|---|---|---|
| DE | 102013205051 | 9/2014 |
| DE | 102014102168 | 9/2015 |
| WO | WO 2016/131577 | 8/2016 |

\* cited by examiner

METHOD, SECURITY DEVICE AND SECURITY SYSTEM

BACKGROUND OF THE INVENTION

1. Field of the Invention

The present invention relates to a security system, a method and a security device for generating an apparatus-specific apparatus certificate for an apparatus.

2. Description of the Related Art

In order to be able to communicate securely with a communication partner in a communication network, an electronic apparatus, in particular a field apparatus, control apparatus or Internet of Things apparatus (IoT apparatus), often has to authenticate itself at the communication partner. As a result of the authentication, the communication partner can ensure that a message is really authentic, i.e., actually originates from the indicated apparatus. The apparatus can be authenticated by the communication partner, for example, based on a digitally signed apparatus certificate containing apparatus-specific information and a public key of the apparatus. The digital apparatus certificate is created, for example, during the production or start-up of the apparatus.

In order to create the apparatus certificate, it is possible to use a public key infrastructure (PKI), which, based on a certification authority (CA), receives a certificate inquiry from the apparatus and generates a digitally signed apparatus certificate. The apparatus certificate created then has to be transmitted via a PKI interface to the apparatus.

Moreover, it is known to embed or to integrate a security module with a security-module-specific security module certificate in an apparatus. However, in that case, too, firstly a security module certificate has to be created and transmitted via an interface to the security module. As a result, the security module can indeed be authenticated, but the apparatus cannot.

SUMMARY OF THE INVENTION

In view of the foregoing, it is an object of the present invention to provide an improved security device for generating an apparatus-specific apparatus certificate for an apparatus, an improved security system, and an improved method for generating an apparatus-specific apparatus certificate for an apparatus.

These and other objects and advantages are achieved in accordance with the invention by a method for generating an apparatus-specific apparatus certificate for an apparatus, wherein the method comprises coupling a security device to the apparatus, where a one-time useable private signing key is stored in the security device, storing apparatus-specific identification information in the security device, accessing the private signing key in the security device, generating the apparatus-specific apparatus certificate depending on the stored identification information in the security device, where the apparatus-specific apparatus certificate is signed using the private signing key, and preventing a further access to the private signing key.

In accordance with an embodiment, a security device is provided which is configured to generate an apparatus-specific apparatus certificate for an apparatus coupled to the security device. The security device comprises a key storage device for storing a one-time useable private signing key, an identification information storage device for storing apparatus-specific identification information, a certificate generating device for generating the apparatus certificate depending on the stored identification information, and a signature device for signing the apparatus certificate using the private signing key read out from the key storage device, where the security device is configured to prevent a further access to the private signing key.

In accordance with a further embodiment, the security device is configured to perform the method described above or below.

The security device is, in particular, a physical hardware security module, such as a cryptocontroller, a secure element (SE), a hardware trust anchor or a trusted platform module (TPM). The security device can be produced separately from the apparatus, and can be coupled to the apparatus for the purpose of creating the apparatus certificate, such as during the manufacture of the apparatus. The security device can be coupled to the apparatus via a cable and/or wirelessly. For this purpose, the security device can be connected to the apparatus via an interface. The security device can also be integrated in the apparatus. The apparatus and the security device can be coupled to one another such that they can exchange data with one another. The security device is removable from the apparatus, in particular.

The security device performs the functionality of a certification authority, in particular. The security device can be used to create an apparatus-specific, in particular unique, digital apparatus certificate for the apparatus. The apparatus certificate can be a digital certificate in accordance with the cryptographic standard X.509. For example, the apparatus with the apparatus certificate can authenticate itself at other apparatuses in a network in order to exchange data with the other apparatuses. The apparatus can be identified based on the apparatus certificate. Apparatus should be understood to mean, in particular, electronic apparatuses, such as field apparatuses, control apparatuses and IoT apparatuses.

After the security device has been coupled to the apparatus, the security device can perform the creation of the apparatus certificate. In this case, the security device can take account of the apparatus-specific identification information, which characterizes the apparatus in a distinctive manner, in particular. For example, the apparatus-specific identification information can be encoded in the apparatus certificate during the creation of the apparatus certificate. By taking account of the apparatus-specific identification information, such as manufacturer, type of apparatus, hardware version, firmware version and serial number, during the creation of the apparatus certificate, the apparatus specificity of the apparatus certificate can be imparted thereto. Different apparatuses can thereby obtain different apparatus certificates. In particular, the apparatus certificates are therefore suitable for the authentication of the apparatuses.

Generating the apparatus certificate can comprise preparing an apparatus certificate draft via the security device. The apparatus certificate draft can already contain all elements of a finished created apparatus certificate in which just the digital signature is missing. The apparatus certificate can then be created by signing the apparatus certificate draft using the signing key.

In one embodiment, the apparatus certificate draft contains one or a plurality of fields, e.g., manufacturer, type of apparatus, hardware version, firmware version and serial number, which is or are to be occupied by a value before the apparatus certificate is able to be created using the signing key.

In a further embodiment, the apparatus certificate draft can define format stipulations (e.g., length, font) and permissible ranges of values for the fields to be occupied. The apparatus certificate is able to be created only if all fields to be filled in are occupied by a value corresponding to the predefined stipulations in accordance with the apparatus certificate draft.

In yet a further embodiment, at least one field, e.g., an apparatus identification character sequence (apparatus name), an apparatus serial number, or a certificate serial number, is automatically occupied by a randomly determined value.

The private signing key stored in the security device is, in particular, a private or secret signature key that can be used only a single time. In particular, the signing key is a cryptographic key. The signing key can already be stored in the security device during the production of the security device.

By virtue of the fact that the signing key is only one-time useable for signing the apparatus certificate, the security device contains in particular the functionality of a one-time certification authority, which can sign an apparatus certificate inquiry only a single time and can thus generate only a single apparatus certificate. A single security device can issue in particular only a single apparatus certificate.

The security device can thus generate an apparatus certificate on an arbitrary apparatus, for example, without a central PKI being required. In particular, it is not necessary for the apparatus to be linked to a PKI and the apparatus need not have a PKI-compatible interface. It is also not necessary to provide, during manufacture, a separate security area or trained security personnel for creating the apparatus certificate. It is thus possible to generate an apparatus-specific apparatus certificate with little expenditure. In particular, with the security device it is possible in a simple manner to provide a secure apparatus with an apparatus certificate.

With the aid of the security device, the apparatus certificate can also be generated in an apparatus that itself does not have security functionality. For generating the apparatus-specific apparatus certificate, the security device merely requires the apparatus-specific identification information. Consequently, an arbitrary electronic apparatus can be provided with an apparatus certificate. With the apparatus certificate, the apparatus can be authenticated for secure communication with other apparatuses in a network. Furthermore, apparatuses from different manufacturers can be equipped with security devices, without the individual manufacturers having to obtain security instructions for the creation of apparatus certificates and without the apparatuses having to be equipped with security modules.

The fact that the signing key is only one-time useable makes it possible to prevent further certificates from being signed using the signing key. Consequently, in particular after the single apparatus-specific apparatus certificate has been generated, it is not possible for counterfeited certificate inquiries to be signed using the same signing key. As a result, counterfeited apparatus certificates cannot be created. An authenticity of the certificate can thus be ensured. As a result, the security of the apparatus provided with the apparatus certificate can be increased.

With the described security device, it is possible to generate an apparatus-specific apparatus certificate for a specific apparatus in a flexible manner. The security device need not be preconfigured during production, in particular. Instead, the apparatus-specific identification information suffices for generating the apparatus certificate.

The apparatus certificate can be stored in the apparatus and/or in the security device. Furthermore, it can be sent via a network to another apparatus (communication partner). The communication partner can check the authenticity of the apparatus using the apparatus certificate and set up a secure data transmission between the apparatus and the communication partner. A secure data transmission should be understood to mean, in particular, a cryptographically encrypted data transmission, which will be described in even greater detail below.

In accordance with a further embodiment, preventing the further access to the private signing key comprises erasing the private signing key, overwriting the private signing key, altering the private signing key and/or blocking an access to the key storage device in which the private signing key is stored. The erasing of the signing key here can be both logical and physical or secure erasing of the signing key.

In accordance with a further embodiment, signing keys stored in a plurality of different security devices are identical. In particular, the plurality of security devices are all provided with identical signing keys during their production, such that the plurality of resulting security devices are completely identical. In particular, it is not necessary to preconfigure the respective security device with respect to the apparatus to which the security device is intended to be coupled during manufacture. By way of example, information about the apparatus to which the security device is intended to be coupled later is not required during the production of the security device. As a result, production of the security device can occur independently of production of the apparatus. There is also no need to give consideration to what identification information a specific apparatus will obtain during manufacture or programming. Consequently, the production of the security device does not require preconfiguration of the security device. As a result, a simplified work sequence for the programming of the apparatus, in particular for the creation of the apparatus certificate for the apparatus, is made possible.

Although a plurality of security devices have an identical signing key, a different apparatus certificate can be generated for each apparatus with the aid of the apparatus-specific identification information.

In accordance with a still further embodiment, the method furthermore comprises receiving the apparatus-specific identification information from the apparatus or via an interface of the apparatus in the security device, or generating the apparatus-specific identification information in the security device.

The apparatus-specific identification information can already be stored in the apparatus before the security device is coupled to the apparatus, and can then be transmitted to the security device after coupling thereto.

The apparatus-specific identification information can be transmitted to the security device from outside the apparatus via the interface. By way of example, a user can provide the apparatus-specific identification information via the interface.

Furthermore, the apparatus-specific identification information can be generated by the security device internally, in particular it can be generated randomly. Given sufficiently large ranges of values for the apparatus-specific identification information, for example, given eight-digit apparatus-specific identification information, the probability of two different apparatuses generating identical random apparatus-specific identification information is negligible. A negligible probability is less than $10^{-5}$, in particular. Even with randomly generated apparatus-specific identification information, it is possible to generate a unique apparatus-specific apparatus certificate.

In accordance with a further embodiment, the method furthermore comprises the checking within the security device whether the stored identification information is stored in a predefined data format, and if the stored identification information is stored in the predefined data format, generating the apparatus-specific apparatus certificate. In particular, the apparatus certificate is only generated if the check determines that the stored apparatus-specific identification information is present in the predefined or prestored data format. The predefined data format can demand and/or necessitate, for example, a permissible range of values for the identification information and/or a format for the identification information. The predefined data format can be defined during production of the security device, or can be predefined by a user.

In accordance with a further embodiment, the method furthermore comprises, in the security device, receiving release information, checking whether the release information corresponds to predefined release information, and if the release information corresponds to the predefined release information, generating the apparatus certificate.

The release information is, for example, an unlock code, a release code or a pin. The release information can be transmitted to the security device by a user or from another apparatus via the interface of the apparatus. In particular, the apparatus certificate is generated only if the checking of the release information identifies that the latter corresponds to the predefined release information. The predefined release information can be stored in a storage device of the security device during the production of the security device.

In accordance with a further embodiment, the method furthermore comprises generating an apparatus key pair comprising a public and a private apparatus key, storing the private apparatus key in a key storage device of the apparatus, and incorporating the public apparatus key in the apparatus certificate in the course of generating the apparatus certificate.

The private and public apparatus keys form in particular a cryptographic apparatus key pair. In particular, the security device generates the key pair. The public key can be incorporated or encoded in the apparatus certificate during the generation of the apparatus certificate such that a communication partner of the apparatus can obtain the public key from the apparatus certificate to communicate with the apparatus with the aid of an asymmetric cryptographic method. In particular, the communication partner can encrypt data intended for the apparatus using the public key, such that said data can be decrypted only by the associated private key stored in the apparatus and are then able to be used further.

In accordance with a still further embodiment, the apparatus-specific identification information contains at least one serial number of the apparatus.

In accordance with another embodiment, the apparatus certificate contains the identification information, a serial number of the apparatus, information about a version of the apparatus, information about the manufacturer of the apparatus, a certificate creation date and/or the private apparatus key. The information about the version of the apparatus can comprise in particular a version concerning the hardware version of the apparatus and/or information concerning the firmware version of the apparatus.

In accordance with an even further embodiment, the apparatus certificate is generated in a predefined certificate format. For this purpose, a certificate original can be contained or stored in the security device, where the certificate original predefines at least some fields of the apparatus certificate. For example, the order of the information obtained in the apparatus certificate can be provided by the certificate original. A standard for the certificate, such as the standard X.509, can also be predefined by the certificate original.

In accordance with a further embodiment, a security system comprising the security device described and the apparatus described is proposed, where the apparatus is configured to be coupled to the security device. In certain embodiments, the security device and the apparatus are communicatively connected to one another.

The embodiments and features described for the proposed method are correspondingly applicable to the proposed security device and to the proposed security system.

Further possible implementations of the method, of the security device and of the security system also encompass combinations (not explicitly mentioned) of features or embodiments described above or below with respect to the exemplary embodiments. In this case, the person skilled in the art will also add individual aspects as improvements or supplementations to the respective basic form of the invention. In particular, an order of the steps described is modifiable.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further advantageous configurations and aspects of the invention are the subject matter of the dependent claims and of the exemplary embodiments described below. The invention is explained in greater detail below on the basis of preferred embodiments with reference to the accompanying figures, in which:

DETAILED DESCRIPTION OF THE EXEMPLARY EMBODIMENTS

In the figures, identical or functionally identical elements have been provided with the same reference signs, unless indicated otherwise.

Figure 1:
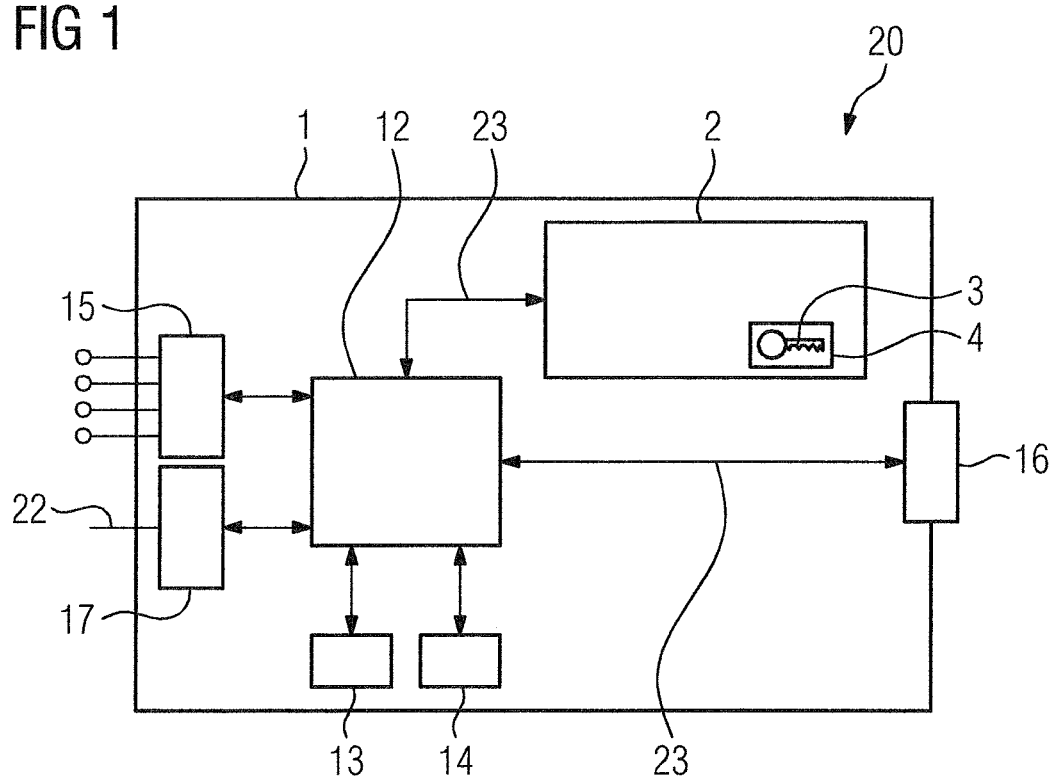
FIG. 1 shows a first embodiment of a security system in accordance with the invention.

FIG. 1 shows a security system 20 in accordance with a first embodiment. The security system 20 comprises an apparatus 1 with an embedded security device 2, which here is a hardware security module (HSM). The apparatus 1 here is an IoT field apparatus that is used as a monitoring field apparatus in a production line. The IoT field apparatus 1 is connected to a network 22, here a field bus, via a network interface 17. The network 22 comprises further IoT apparatuses (not illustrated), which exchange data with the IoT field apparatus 1 via the network 22. The further IoT apparatuses are communication partners for the IoT field apparatus 1, hereinafter also just called field apparatus 1.

The field apparatus 1 furthermore comprises an input and output interface 15, a processor 12, two apparatus storage devices 13, 14 and a user interface 16. The individual elements of the field apparatus 1 are connected to one another via connections 23, here an internal bus system. Here, the user interface 16 is a USB interface via which a user can transmit data to the field apparatus 1 and can read out data from the field apparatus 1. In particular, the field apparatus 1 is configured during programming via the USB interface 16. The user makes available, for example, to the HSM 2 apparatus-specific identification information, which will also be described below, via the USB interface 16.

The input and output interface 15 is formed as a unit for connection to external sensor units (not illustrated), by which the field apparatus 1 can detect a pressure and a temperature at the field apparatus 1. Detected pressure and sensor data can be stored in the apparatus storage devices 13, 14. Furthermore, actuators can be connected to the input and output interface 15. By way of example, a valve as actuator can be driven by the field apparatus 1 if the detected pressure or the detected temperature exceeds a respective predefinable threshold value.

The apparatus storage device 13 is formed as a RAM memory, and the apparatus storage device 14 is formed as a flash memory. The pressure and temperature data stored in the apparatus storage devices 13, 14 can be encrypted by the security device 2 with the aid of a private cryptographic key, which will be described in greater detail below, and thus be securely transmitted to the other apparatuses or communication partners via the network 22.

Figure 2:
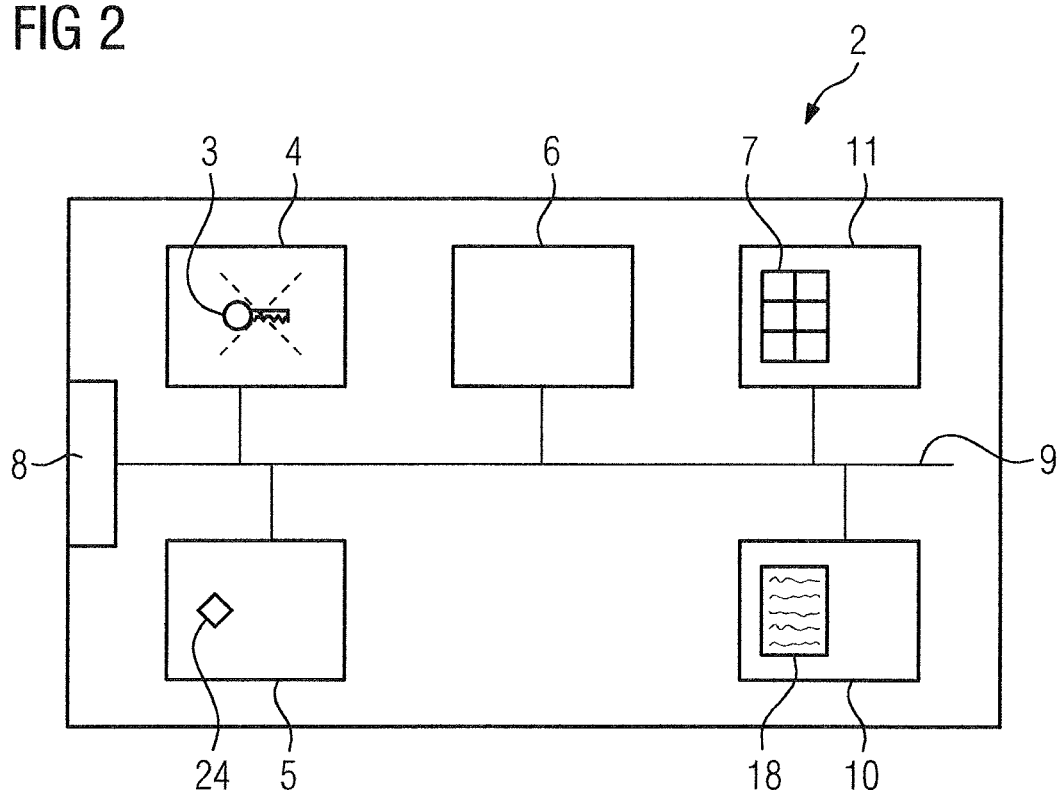
FIG. 2 shows a first embodiment of a security device in accordance with the invention.

The HSM 2 is described in greater detail with reference to FIG. 2, which shows a security device 2 in accordance with a first embodiment. The HSM 2 comprises a key storage device 4, an identification information storage device 5, a certificate generating device 6 and an interface 8, which are connected to one another via an internal bus 9. Optionally, the security element 2 can additionally also comprise a certificate storage device 10 and an original storage device 11.

The interface 8 serves for coupling the HSM 2 to the field apparatus 1. Data can be exchanged between the HSM 2 and the field apparatus 1 via the (physical) interface 8. During the production of the HSM 2, an HSM-nonspecific signing key 3 is stored in the key storage device 4, which is a secure storage device. In this case, the signing key 3 is a one-time useable private signing key.

The identification information storage device 5 serves to store the identification information 21 provided by the user via the USB interface 16. The certificate generating device 6 can create and sign an apparatus-specific apparatus certificate 18. An original 7 for the apparatus certificate 18 is stored in the original storage device 11, where the original is used during the generation of the apparatus certificate 18 by the certificate generating device 6. The original 7 determines a format of the apparatus certificate to be generated. In the present embodiment, the original 7 stipulates, for example, that the apparatus certificate 18 is intended to contain a serial number and a certificate creation date. The apparatus certificate 18 is a digital certificate in accordance with the cryptographic standard X.509.

In one embodiment, the HSM 2 has an integrated timer as a real-time clock, which is not illustrated in the figure. In another, time information is provided for the certificate generating device 6 of the HSM 2 via the interface 8. The time information can be interrogated by the processor 12 of the field apparatus 1 from a timer component (not illustrated) of the field apparatus 1 and be provided for the HSM 2. In a further embodiment, a time synchronization server connected to the field apparatus 1 via the network interface creates time synchronization information protected by a cryptographic checksum, where the time synchronization information is received by the field apparatus 1 and provided for the HSM 2.

The generated apparatus certificate 18 can now be stored in the certificate storage device 10 to be used for the authentication of the field apparatus 1.

Figure 3:
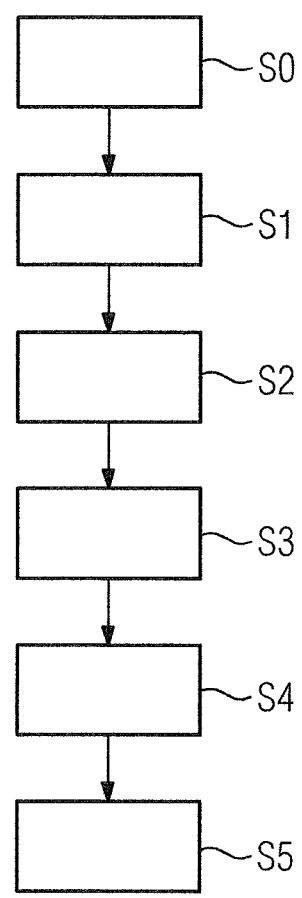
FIG. 3 shows a flow diagram for a method for generating an apparatus-specific apparatus certificate for an apparatus in accordance with a first embodiment.

The functionality of the individual elements of the HSM 2 is described in greater detail with reference to FIG. 3. FIG. 3 in this case shows a method for generating an apparatus-specific apparatus certificate for an apparatus 1 in accordance with a first embodiment. The method illustrated in FIG. 3 can be performed in particular by the HSM 2 in FIG. 1 or 2 to generate an apparatus certificate 18 for the field apparatus 1 in FIG. 1.

In a preparation step S0, the field apparatus 1 and the HSM 2 are provided separately. The signing key 3 is already securely stored in the key storage device 4 of the HSM 2.

In a step S1, the HSM 2 and the field apparatus 1 are coupled to one another. The HSM 2 is integrated in a housing of the field apparatus 1 during coupling. The coupling of the HSM 2 and of the field apparatus 1 has the effect that they can communicate via the interface 8.

In a step S2, apparatus-specific identification information 21 is stored in the HSM 2. Here, the apparatus-specific identification information 21 is a serial number of the field apparatus 1. The serial number 1 is a unique alphanumeric designation that can be used for identifying the field apparatus 1 and is thus apparatus-specific. The serial number 21 is obtained from the field apparatus 1 by the user via the USB interface 16 and is transmitted to the HSM 2 via the internal bus system 23. In the HSM 2, the serial number 21 is stored in the identification information storage device 5.

In a step S3, the private signing key 3 is accessed in the HSM 2. Here, the signing key 3 is read out from the key storage device 4 by the certificate generating device 6.

In a step S4, the apparatus-specific apparatus certificate is generated by the certificate generating device 6. Firstly, the certificate generating device 6 generates a certificate original in accordance with the standard X.509, where the certificate original corresponds to a non-signed apparatus certificate. Here, the certificate generating device 6 accesses the original 7 stored in the original storage device 11. Furthermore, the certificate generating device 6 takes account of the received serial number 18 and also encodes the latter in the certificate original.

The certificate original is thereupon signed by the certificate generating device 6 using the signing key 3 accessed in step S3. This gives rise to the apparatus certificate 18 in the format predefined by the original 7. It contains, in particular, the serial number 21 obtained in step S2, as a result of which the apparatus specificity of the apparatus certificate 18 is ensured. The apparatus certificate furthermore contains the certificate creation date, for example. The generated apparatus certificate 18 is stored in the certificate storage device 10.

In a step S5, a further access to the private signing key 3 is prevented. For this purpose, the signing key 3 is erased from the key storage device 4, as is illustrated by the signing key 3 scored through in a dashed manner in FIG. 2. As a result, further apparatus certificates 18 can no longer be generated.

By virtue of steps S1 to S5 being performed by the HSM 2 in the field apparatus 1, the apparatus-specific apparatus certificate 18 is created for the field apparatus 1. As a result, the security functions of the field apparatus 1 are imparted thereto. For the purpose of establishing secure communication with another apparatus from the network 22, the apparatus certificate 18 can be sent to the other apparatus (communication partner). The communication partner authenticates the field apparatus 1 using the received apparatus certificate 18, as a result of which the secure communication is made possible.

Figure 4:
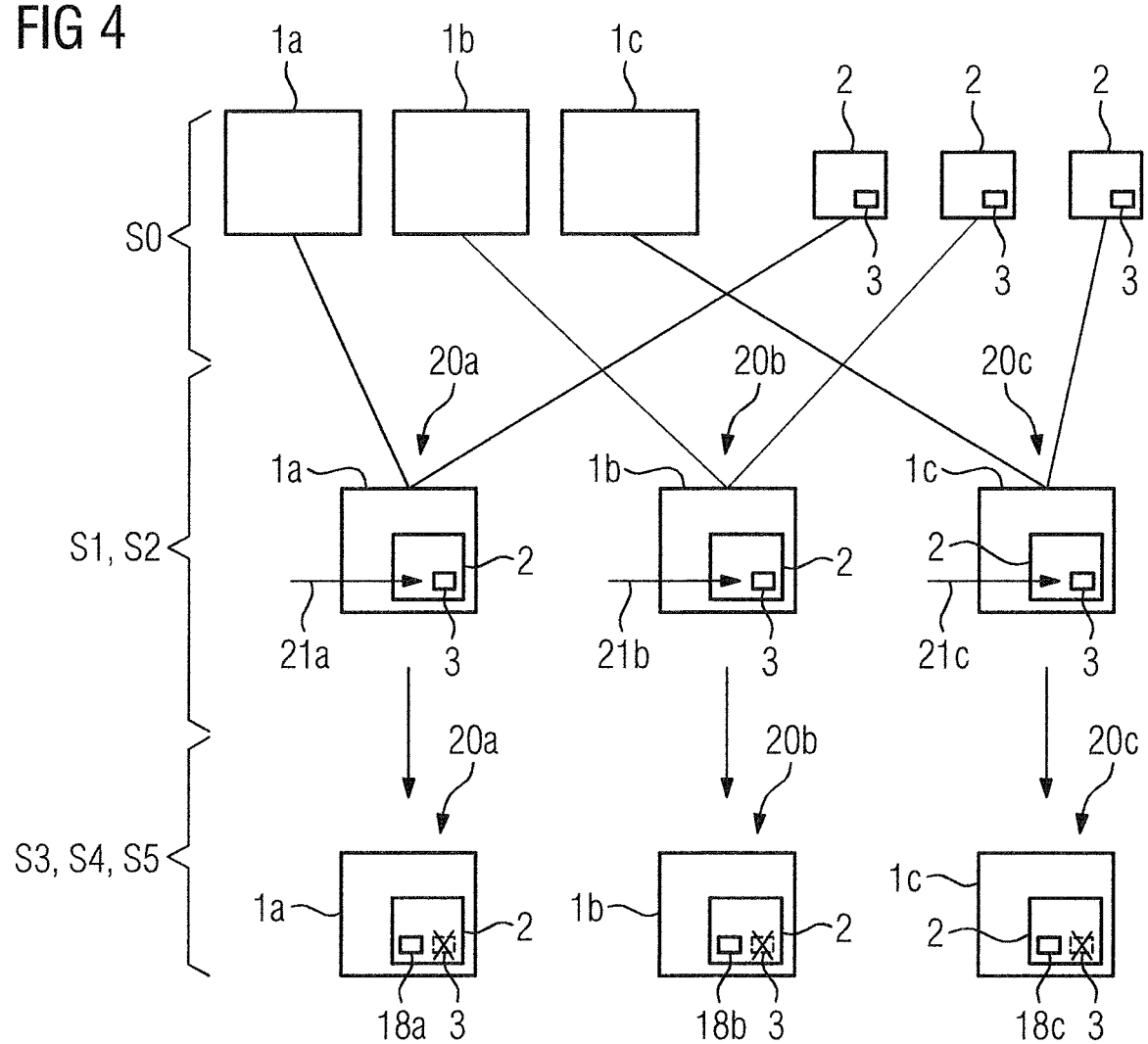
FIG. 4 shows a flow diagram for a method for generating apparatus-specific apparatus certificates for a plurality of apparatuses in accordance with a first embodiment.

FIG. 4 shows a method for generating apparatus-specific apparatus certificates for a plurality of apparatuses in accordance with a first embodiment. Here, steps S0 and S5 from FIG. 3 are performed in parallel at three security systems 20a, 20b and 20c. In FIG. 4, apparatus-specific apparatus certificates for three different field apparatuses 1a, 1b and 1c are generated in parallel with one another. Here, the apparatus certificates are not generated at the same time, nor are the three security systems 20a, 20b and 20c situated at the same physical location. The three apparatus certificates are created independently of one another. The field apparatuses 1a, 1b and 1c comprise the same components as the field apparatus 1 from FIG. 1.

In the preparation step S0, the three field apparatuses 1a, 1b and 1c are provided. These are identical field apparatuses to which different serial numbers are allocated. The serial number is a unique alphanumeric designation that can be used for identifying the field apparatus 1a, 1b, 1c and is thus apparatus-specific. In the preparation step S0, furthermore, three completely identical HSMs 2 are provided, each comprising the same signing key 3.

In step S1, the field apparatuses 1a, 1b and 1c are respectively coupled to an HSM 2. The coupling is effected as already described with respect to FIG. 3. The security systems 20a, 20b and 20c are formed as a result.

In step S2, the user inputs the serial number 21a, 21b and 21c into the field apparatus 1 via the USB interface 16, where the field apparatus forwards the serial number to the HSM 2 via the internal bus system 23. Consequently, in step S2, each of the HSMs 2 obtains a serial number 21a, 21b and 21c and stores it in identification information storage devices 5 (not illustrated). In steps S3 and S4, the respective signing keys 3 are accessed and, taking into account the respective serial numbers 20a, 20b and 20c, apparatus certificates 18a, 18b and 18c are generated, which contain the serial numbers 20a, 20b and 20c and are signed using the signing keys 3.

In step S5, a further access to the respective signing keys is prevented by the latter being erased from the respective key storage devices 4 (not illustrated) of the HSM 2. In FIG. 4, the erased signing keys 3 are illustrated in a dashed and scored-through manner.

FIG. 4 therefore shows how, based on the method from FIG. 3 with a plurality of identical HSMs 2 in a plurality of field apparatuses 1a, 1b and 1c it is possible to generate different, apparatus-specific apparatus certificates 18a, 18b and 18c for the authentication of the field apparatuses 1a, 1b and 1c. In particular, no central PKI is required for this purpose.

Although apparatus certificates 18a, 18b and 18c for three field apparatuses 1a, 1b and 1c are created in FIG. 4, in a corresponding method it is possible to generate apparatus certificates for as many field apparatuses as desired with only one type of security devices or HSMs 2.

Figure 5:
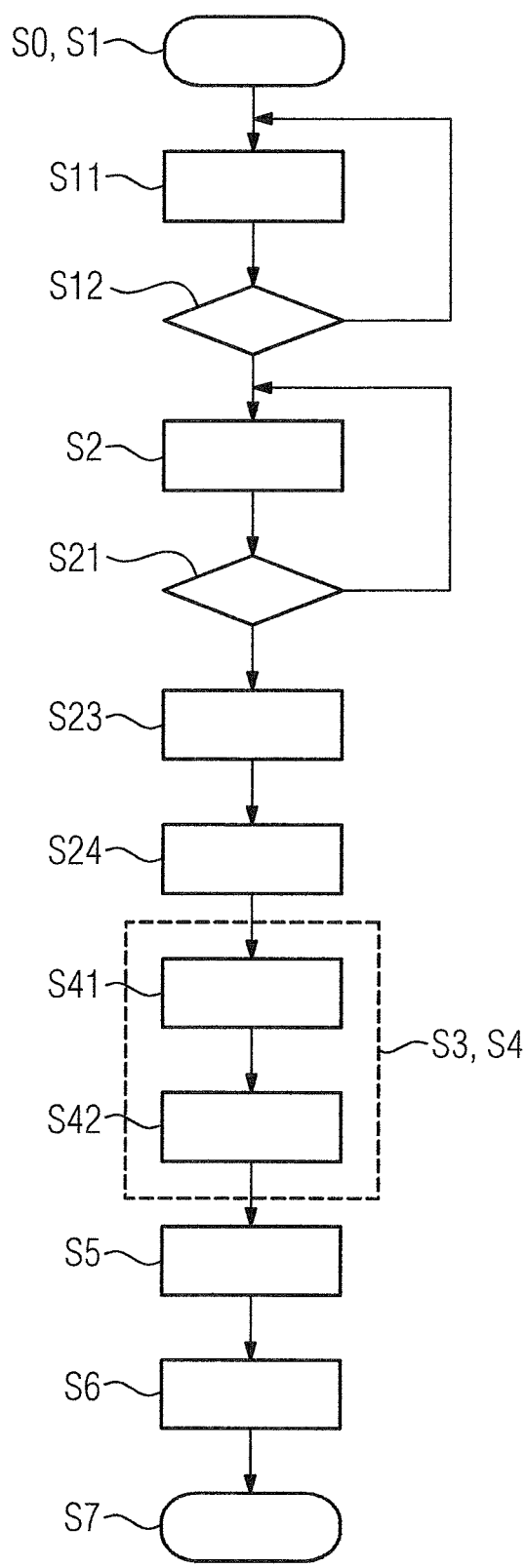
FIG. 5 shows a flow diagram for a method for generating an apparatus-specific apparatus certificate in accordance with a second embodiment.

FIG. 5 shows a modified method for generating an apparatus-specific apparatus certificate in accordance with a second embodiment. With the method in accordance with the second embodiment, the apparatus certificate 18 is created only if certain prerequisites are met, as a result of which the apparatus certificate 18 is created with increased security. The HSM 2 from FIG. 2 can perform the method from FIG. 5. In the method in accordance with the second embodiment, steps S0, S1, S2, S3, S4 and S5 are identical to the steps S0 to S5 from the first embodiment in accordance with FIG. 3 and will not be described again.

In addition to steps S0 to S5, in the method in accordance with the second embodiment, in a step S11, after the coupling of the HSM 2 to the field apparatus 1 in accordance with steps S0 and S1, the HSM 2 receives release information, here an unlock code. The unlock code is transmitted to the field apparatus 1 by the user via the USB interface 16 and is then communicated via the interface 8 to the HSM 2.

In a step S12, the received unlock code is compared with a predefined unlock code (e.g. 1234) as predefined release information. In one embodiment, the validity of the received unlock code is checked based on predefined check information. The predefined unlock code or the predefined check information is stored in a protected manner in the identification information storage device 5, hereinafter also just called storage device 5, as early as during the production of the HSM 2. If the received unlock code corresponds to the predefined unlock code or if the received unlock code is able to be checked as valid based on the predefined check information, then the method transitions to step S2. Otherwise, steps S11 and S12 are repeated until an unlock code that corresponds to the predefined unlock code is received.

In a step S21, the HSM 2 furthermore checks whether the serial number stored in step S2 is permissible. For this purpose, the format of the stored serial number is compared with a predefined data format stored in the identification information storage device 5 during the production of the HSM 2. The predefined data format stipulates, for example, that the serial number must contain three letters and six numerals. If the data formats correspond, it is determined in step S21 that the data format of the stored serial number is permissible, and the method is continued with a step S23. If the data formats do not correspond, steps S2 and S21 are repeated. That is, a serial number is once again input by the user (S2), and a check is once again made to ascertain whether the serial number has the predefined data format (S21).

In a step S23, the HSM 2 generates a cryptographic apparatus key pair comprising a cryptographic private and a cryptographic public apparatus key. In a step S24, the private apparatus key is stored in the storage device 5. The private apparatus key is used for decrypting data encrypted using the public apparatus key.

In a step S41, the certificate original is created by the certificate generating device 6. In addition to the received serial number 21, the certificate original also obtains the public apparatus key that was generated in step S23.

In a step S42, the certificate original is signed by the certificate generating device 6 using the signing key 3, and the creation of the apparatus certificate 18 is thus finished. The apparatus certificate 18 contains at least the serial number 21 and the public apparatus key. Steps S41 and S42 are part of steps S3 and S4 already described.

In step S5, as already described above, the signing key 3 is erased. In a step S6, the apparatus certificate generated in step S4 is stored in the certificate storage device 10.

The method in accordance with the second embodiment is terminated with step S7. The field apparatus 1 can send the apparatus certificate 18 to the further field apparatuses or communication partners in the network or field bus 22 from FIG. 1 in order that they can authenticate it on the basis of the information in the apparatus certificate 18, in particular based on the serial number 21. Secure communication between the field apparatus 1 and the further field apparatuses can occur because the further field apparatuses obtain the public apparatus key with the apparatus certificate 18 of the field apparatus 1. Here, secure communication here denotes an exchange of cryptographically protected data.

Figure 6:
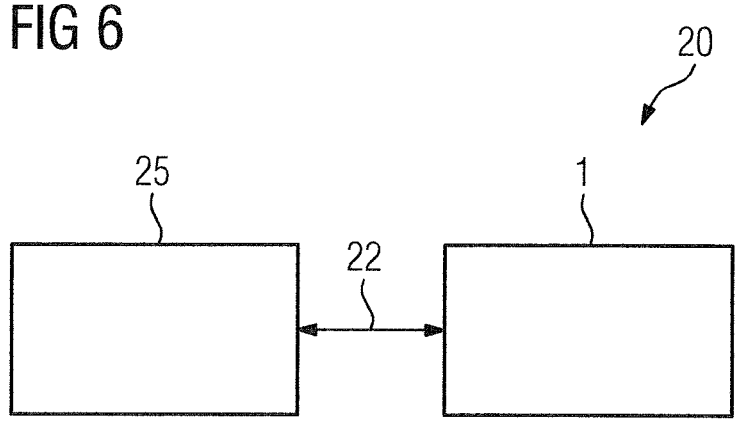
FIG. 6 shows a secure communication of apparatuses in a network in accordance with a first embodiment.

This secure communication between the field apparatus 1 and a further apparatus 25 in the network 22 is illustrated in FIG. 6. The further apparatus 25 is also a field apparatus and here is the communication partner of the field apparatus 1. Here, the communication partner 25 is an electric motor. The field apparatus 1 and the communication partner 25 are coupled to one another via the network 22. Once the field apparatus 1 is coupled to the communication partner 25, the field apparatus 1 sends its apparatus certificate 18 created with the aid of the HSM 2 to the communication partner 25. The communication partner 25 reads out the information contained in the apparatus certificate 18, i.e., the serial number 21, the certificate creation date, on the public apparatus key, and thus checks the validity of the apparatus certificate 18. Checking validity involves checking based on the certificate creation date, for example, whether the apparatus certificate 18 is still not too old or has already expired.

If the communication partner 25 determines that the apparatus certificate 18 is invalid because it has already expired, for example, the secure communication between the field apparatus 1 and the communication partner 25 is not established.

If the communication partner 25 determines that the apparatus certificate 18 is valid, the secure communication between the field apparatus 1 and the communication partner 25 is established. The secure communication occurs via the network 22 already present. The communication partner 25 uses the public apparatus key obtained in the apparatus certificate 18 to encrypt data. The data are data about a motor state, for example, which are to be transmitted to the field apparatus 1. The encrypted data are transmitted via the network 22 to the field apparatus 1, which decrypts the received data based on the stored private apparatus key. The decrypted data can then be used further by the field apparatus 1, for example, can be modified or can be output to the user via the USB interface 16.

The secure communication between the field apparatus 1 and the communication partner 25 as illustrated in FIG. 6 can correspondingly, occur between the field apparatus 1 and further communication partners.

Although the present invention has been described based on exemplary embodiments, it is modifiable in diverse ways. By way of example, arbitrary electronic apparatuses, such as IO-link apparatuses, can be used instead of the IoT field apparatus 1 described. Moreover, the electronic apparatus can be of arbitrary construction and can comprise, for example, additional interfaces and/or sensor elements. The identification information can be arbitrary apparatus-specific information and can, for example, also be a description of the apparatus instead of the serial number. The identification information can also be generated as a random number by the security device 2. Instead of erasing the signing key, it is also possible to block the access to the signing key. The apparatus certificate generated can also be stored in the apparatus storage device 13 instead of in the security device 2. The order of the method steps described in FIGS. 3 and 5 is modifiable; by way of example, erasing the signing key can be carried out before generating the apparatus certificate.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for generating an apparatus-specific apparatus certificate for an apparatus, comprising:
    coupling a security device to the apparatus, a one-time useable private signing key being stored in the security device;
    storing apparatus-specific identification information in the security device;
    accessing the private signing key in the security device;
    generating the apparatus-specific apparatus certificate depending on the stored apparatus-specific identification information in the security device, the apparatus-specific apparatus certificate being signed using the private signing key;
    preventing a further access to the private signing key;
    generating an apparatus key pair comprising a public and a private apparatus key;
    storing the private apparatus key in a key storage device of the apparatus; and
    incorporating the public apparatus key in the apparatus certificate while generating the apparatus certificate.

2. The method as claimed in claim 1, wherein preventing the further access to the private signing key comprises at least one of (i) erasing the private signing key, (ii) overwriting the private signing key, (iii) altering the private signing key and (iv) blocking an access to a key storage device in which the private signing key is stored.

3. The method as claimed in claim 1, wherein signing keys stored in a plurality of different security devices are identical.

4. The method as claimed in claim 2, wherein signing keys stored in a plurality of different security devices are identical.

5. The method as claimed in claim 1, further comprising: one of:
    (i) receiving the apparatus-specific identification information from the apparatus or via an interface of the apparatus in the security device; and (ii) generating the apparatus-specific identification information in the security device.

6. The method as claimed in claim 1, further comprising:
in the security device,
checking in the security device whether the stored identification information is stored in a predefined data format; and
generating in the security device the apparatus-specific apparatus certificate if the stored identification information is stored in the predefined data format.

7. The method as claimed in claim 1, further comprising:
receiving release information in the security device;
checking in the security device whether the release information corresponds to predefined release information; and
generating in the security device the apparatus-specific apparatus certificate if the release information corresponds to the predefined release information.

8. The method as claimed in claim 1, wherein the apparatus-specific identification information contains a serial number of the apparatus.

9. The method as claimed in claim 1, wherein the apparatus certificate contains at least one of (i) the identification information, (ii) the serial number of the apparatus, (iii) information about a manufacturer of the apparatus, (iv) information about a version of the apparatus, (v) a certificate creation date and (vi) the private apparatus key.

10. The method as claimed in claim 1, wherein the apparatus certificate is generated in a predefined certificate format.

11. A security device which is configured to generate an apparatus-specific apparatus certificate for an apparatus coupled to the security device, comprising:
a key storage device for storing a one-time useable private signing key;
an identification information storage device for storing apparatus-specific identification information; and
a certificate generating device for generating the apparatus certificate depending on the stored identification information and for signing the apparatus certificate using the private signing key read out from the key storage device;
wherein the security device is configured to:
generate an apparatus key pair comprising a public and a private apparatus key;
store the private apparatus key in a key storage device of the apparatus;
incorporate the public apparatus key in the apparatus certificate while generating the apparatus certificate; and
prevent a further access to the private signing key.

12. The security device as claimed in claim 11, the security device being further configured to:
access the private signing key in the security device; and
generate the apparatus-specific apparatus certificate depending on the stored apparatus-specific identification information in the security device, the apparatus-specific apparatus certificate being signed using the private signing key.

13. A security system comprising:
a security device which is configured to generate an apparatus-specific apparatus certificate, the security device comprising:
a key storage device for storing a one-time useable private signing key;
an identification information storage device for storing apparatus-specific identification information; and
a certificate generating device for generating the apparatus certificate depending on the stored identification information and for signing the apparatus certificate using the private signing key read out from the key storage device; and
an apparatus which is configured to be coupled to the security device and which receives the apparatus-specific apparatus certificate;
wherein the security device is configured to:
generate an apparatus key pair comprising a public and a private apparatus key;
store the private apparatus key in a key storage device of the apparatus;
incorporating the public apparatus key in the apparatus certificate while generating the apparatus certificate; and
prevent a further access to the private signing key.

* * * * *